Aug. 7, 1945. F. E. FREY 2,381,659
REGENERATION OF CATALYTIC MATERIAL
Filed Dec. 18, 1941
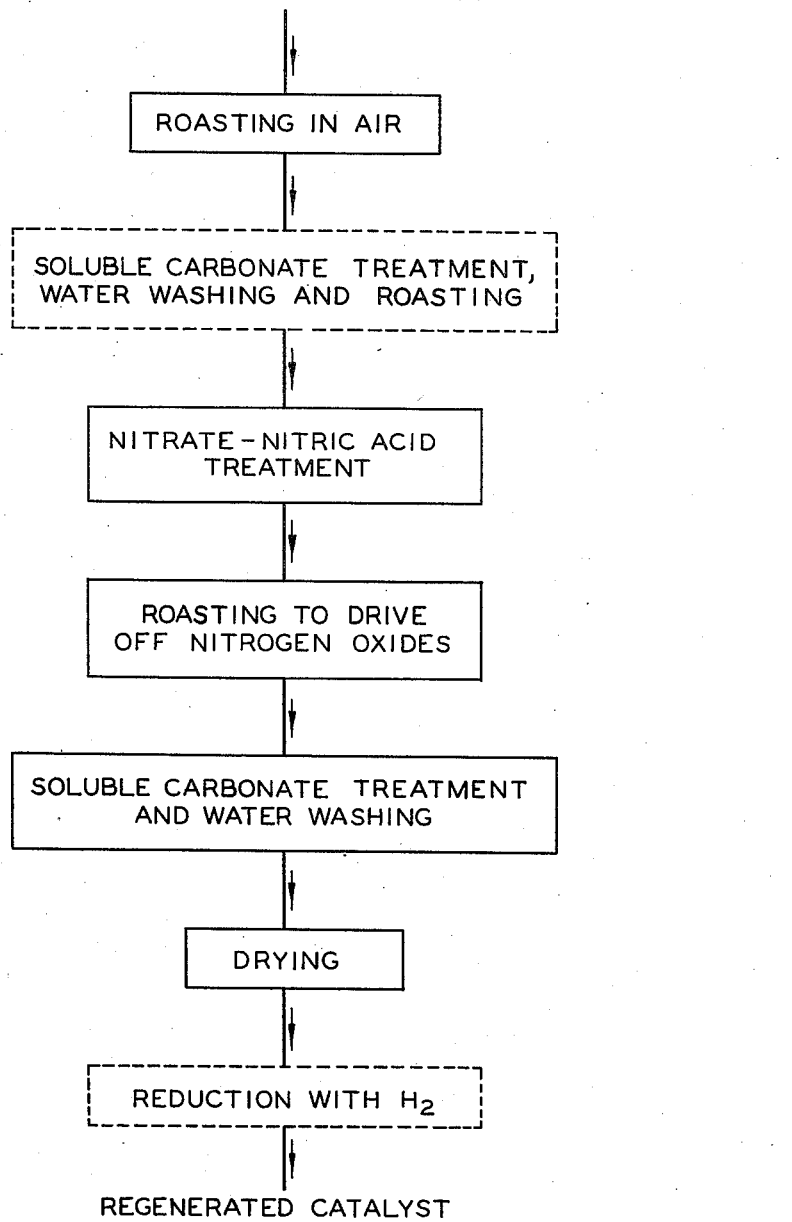
INVENTOR
FREDERICK E. FREY
BY
ATTORNEY Patented Aug. 7, 1945

2,381,659

UNITED STATES PATENT OFFICE 2,381,659

REGENERATION OF CATALYTIC MATERIAL

Frederick E. Frey, Bartlesville, Okla., assignor to Phillips Petroleum Company, a corporation of Delaware Application December 18, 1941, Serial No. 423,536

11 Claims. (Cl. 252—240)

This invention relates to the regeneration of spent or deactivated catalysts and more particularly to the regeneration of copper and/or nickel metallic hydrogenation catalysts which have been poisoned by sulfur.

A large number of elements or combinations of elements or compounds are used as catalysts for the hydrogenation of unsaturated compounds. Metals, such as copper, nickel, and platinum, either alone or in various combinations; oxides, such as nickel, copper, manganese, cobalt, and iron, either alone or in various combinations; and sulfides, such as molybdenum, zinc, and chromium, either alone or in various combinations, have found application as hydrogenation catalysts.

Particularly valuable for non-destructive hydrogenation of olefins are metal catalysts, such as nickel, cobalt, or copper, prepared in a highly active state. Catalysts of this type are commonly prepared by depositing metallic salts, such as the nitrates, on suitable supports, such as pumice, kieselguhr, alumina, etc., followed by decomposition and reduction. Such catalysts are extremely active and have long life, and they may be used for very long periods of time in the hydrogenation of pure olefins. Under certain conditions, however, the life of the catalyst is greatly impaired. This is particularly true if sulfur is present in the olefins or under conditions where carbonaceous material is deposited on the catalyst. In such cases it is desirable to have a method for regenerating the catalyst to an active state. This can be done to a greater or lesser degree by a number of processes. This invention is particularly concerned with a highly efficient method for regenerating such spent or deactivated hydrogenation catalysts.

It has long been known that copper, nickel, or mixtures of copper and nickel have valuable properties as hydrogenation catalysts and are useful in the hydrogenation of hydrocarbons, organic compounds, edible oils, and the like. In hydrogenating a charge stock which contains mercaptans or other sulfur compounds by using a catalyst comprising copper, nickel, or both, there is a rapid deactivation of the catalyst due to sulfur poisoning. Another contributing factor to catalyst deactivation is the formation of carbonaceous or other oxidizable material in and/or on the catalyst.

Accordingly it is desirable to provide a process which enables the elimination of the deposit of carbonaceous material from the spent catalyst and also the reduction of the sulfur content in the spent catalyst to a negligible figure such that it exerts no deleterious effect upon the activity of the catalyst, and it is the principal object of the present invention to provide such a process. Another object is to provide an improved process for regenerating heavy metal-containing catalysts broadly used for any type of catalytic process and thereby contaminated with sulfur or compounds thereof. Another object is to provide an improved method for regenerating spent nickel and/or copper metallic catalysts. Another object is to provide such a process for regenerating spent nickel oxide and/or copper oxide catalysts. Another object is to provide such a method for regenerating roasted, spent metallic or metallic oxide catalysts. Still another object is to provide an improved method for the conversion of insoluble sulfur compounds in an oxidized hydrogenation catalyst to soluble compounds. Still another object is to provide an improved method for the removal of both soluble and insoluble sulfur compounds from a roasted spent metallic or metallic oxide hydrogenation catalyst. Still other objects will more fully hereinafter appear.

Complete removal of the residual sulfur from the spent catalyst is a desideratum. I have found that residual sulfur, existing as sulfate in a copper and/or nickel hydrogenation catalyst, in quantities as low as one-tenth of one per cent exerts a deleterious action on catalyst activity. It is desirable therefore that a process be available which enables the reduction of residual sulfur to below about 0.1 per cent. My invention provides such a process.

The accompanying drawing portrays diagrammatically a flow diagram of a typical procedure in accordance with the present invention. Steps which are optional are indicated in dotted lines.

Generally my invention is applied to the conversion to active form of a spent or inactive metallic hydrogenation catalyst containing carbonaceous deposits and poisoned with sulfur combined with the metal of the catalyst in the form of sulfide or other sulfur compounds or sulfur-containing material. While I prefer to apply my invention to a catalyst containing nickel or a mixture of copper and nickel, I am not limited thereto and may operate upon other hydrogenation catalyst mixtures containing sulfur-susceptible heavy metals which form water-soluble nitrates such as cobalt, manganese, iron and the like.

In addition my invention may be applied to hydrogenation catalysts containing oxides of copper, nickel, manganese, cobalt, iron and the like, and mixtures thereof, and particularly to catalysts containing copper oxide and/or nickel oxide.

My invention is applicable to hydrogenation catalysts which are not laden with carbonaceous material but which have been poisoned or rendered inactive by the combination of sulfur with the metallic component thereof. Thus it is applicable to either an elemental metal or a metallic oxide containing catalyst which during use has not picked up organic material or carbon but has been contaminated with sulfur which has reacted with either the elemental metal or the metallic oxide to form the corresponding metallic sulfide. Preferably my invention is applied to a catalyst which has already been roasted to remove combustible material therefrom.

My invention in a typical embodiment may comprise the following steps:

1. The spent metallic or metallic oxide hydrogenation catalyst is roasted in air or other oxygen-containing gas at a temperature of from about 900° to about 1200° F. to substantially completely remove organic and combustible material therefrom. In the case of a metallic catalyst this step may convert the elemental metal at least partially to the oxide. In this step part of the sulfur is removed from the catalyst, another portion is combined with the metal in the catalyst as a water-soluble salt, and the balance is combined with the metal as a water-insoluble salt.

2. The roasted catalyst is then cooled and treated, as by contacting, with an aqueous alkali or other soluble carbonate solution such as sodium carbonate solution, using an excess of the carbonate, to convert the soluble heavy metal salts to insoluble carbonates, which are retained on the catalyst support. The reactive sulfates are converted to soluble sodium salts. The catalyst is then water-washed to remove all water-soluble material (the excess sodium carbonate and the sodium salts formed therefrom). In this way any loss of the active heavy metal is prevented. The thus-treated catalyst is then roasted at a moderate temperature say at from about 600° to about 700° F., usually in air, to decompose the carbonates to oxides.

3. The catalyst is then treated with an aqueous solution of one or more nitrates of heavy, non-noble metals which, or the oxides of which, are hydrogenation catalysts, and preferably of the same metals as are present in the catalyst or with an aqueous solution of such metallic nitrate or nitrates containing excess nitrate supplied by the presence of free $HNO_3$, or finally with an aqueous solution of $HNO_3$. Of course, the second-named solution is preferred because the use of a solution of nitrates of metals present in the catalyst prevents depletion of the content of catalytic metal and the use of an excess of nitrate insures a more effective removal of sulfur.

In place of nitric acid in this step, I may, though less preferably, use other suitable strong oxidizing acids which may be removed by volatilization or decomposition into volatile materials upon heating and which do not poison the catalyst or leave a residue which poisons the catalyst or unduly changes the composition of the catalyst. Sulfuric acid or other sulfur-containing acids are not suitable because they poison the catalyst. Hydrochloric acid or other chlorine-containing acids such as chloric are unsuitable because the chlorine poisons the catalyst. Chromic acid is unsatisfactory because the residue changes the composition of the catalyst. Nitric acid is the only acid which I have found meeting the requisites.

4. The catalyst is then roasted at a relatively low temperature, preferably from about 600 to about 700° F. in air or other oxygen-containing gas to drive off all volatile material and all of the nitrogen oxides contained therein. This converts any catalytic metal nitrate added or formed by reaction of the free $HNO_3$ with the metal of the spent catalyst to the oxide form.

The treatment by steps 3 and 4 converts the water-insoluble sulfur left in the catalyst at the end of step 2 to the water-soluble form (the sulfate) in which it may be removed by carbonate treatment and water extraction.

5. The catalyst is then cooled and treated again as in step 2 by washing with an excess of an aqueous alkali or other soluble carbonate such as sodium carbonate solution to convert soluble heavy metal salts to carbonate and simultaneously form sodium salts of the sulfur acids. It is then washed with water to remove all water-soluble material including this water-soluble sulfate and any excess alkaline or other carbonate, and dried and is ready for re-use in catalytic hydrogenation, preferably after conversion of the metal carbonate to the elemental metal as by heating to drive off $CO_2$ and form the heavy metal oxide and reducing with hydrogen, ammonia, etc.

The roasting step 1 reduces the content of carbonaceous material to a negligible quantity. The roasting step 1 and the carbonate extraction and washing step 2 remove from about 30 to about 40% of the sulfur. The use of all of steps 1 to 5 effects a 60–65% sulfur removal where a solution of nitrate or nitrates is used in step 3 and at least about a 95% sulfur removal where a solution of nitrate or nitrates and free nitric acid is used.

As will appear below, step 2 may in some cases be omitted, though this procedure is less preferable. As illustrative of my invention, an inactive hydrogenation catalyst containing copper, nickel, or a mixture of copper and nickel is first roasted in air under conditions wherein the carbonaceous material is substantially completely oxidized, usually at 900–1200° F. This treatment also effects conversion of the metallic sulfides to sulfates. After the formation of the sulfates, catalyst activity is still very low, however. Carbonate extraction of the water-soluble sulfate is now readily accomplished by treatment of the catalyst at this stage with an aqueous solution of alkali carbonate which contains the carbonate in amount from about 20 to about 80% of the amount required to give a saturated solution at the operating temperature. This treatment may be carried out by soaking the catalyst without agitation in the carbonate solution for a prolonged period of time and at room or moderately elevated temperature and then separating from the excess solution as by filtering or decanting or draining. After this treatment, the copper and/or nickel remain on the catalyst as the respective carbonates. A subsequent water-wash of the catalyst eliminates all of the water-soluble material including water-soluble sulfur and alkali carbonate. The insoluble sulfur, which may be bound as a basic sulfate, is substantially unaffected by the carbonate extraction. Accordingly the catalyst is preferably treated as by step 3 above to convert the insoluble sulfur to a soluble sulfate by the action of nitric acid or a selected nitrate solution.

The soluble carbonate treatment of the roasted, spent catalyst, followed by washing as described in step 2, is helpful in restoring catalyst activity in that it converts nickel sulfate to insoluble nickel carbonate and soluble sulfate (usually sodium sulfate), the washing step extracting the latter, and thereby effects a removal of about 30–40% of the sulfur, the remainder of the sulfur being in an insoluble form. For example, treatment of a spent catalyst containing 1.35% of residual sulfur in accordance by the foregoing series of steps lowers the residual sulfur content to 0.80%. Since this quantity of sulfur is distinctly injurious to catalyst activity, treatment in such a manner as to substantially remove the balance of the sulfur is desirable.

The carbonate treatment of steps 2 and 5 may be conducted by soaking the catalyst in a sufficient quantity of solution of the soluble carbonate to cover the catalyst followed by separation after sufficient time has elapsed for thorough diffusion. Separation may be effected by draining, decantation, filtration, etc. The total amount of carbonate contained in the treating solution should be in excess of that required to react with all of the water-soluble salts of the heavy metals present in the catalyst. In practice the carbonate solution contains from about 20 to about 80% of the amount of carbonate required to saturate the solution at the operating temperature which may range from atmospheric to about 180° F.

As soluble carbonate in steps 2 and 5 above, I prefer to use sodium carbonate although other carbonates such as those of potassium, lithium, ammonium, etc. may be satisfactory.

I have found that the effectiveness of removal of sulfur may be substantially enhanced by treatment of the catalyst with an aqueous solution of a nitrate or nitrates of a catalytic metal or metals and preferably of the metal or metals in the spent catalyst, preferably also containing an excess of nitrate supplied by the presence of free $HNO_3$, or with an aqueous solution of nitric acid itself, followed by roasting at moderately elevated temperatures to convert metal nitrates to oxide. The treatment with the solution may be conducted by soaking the catalyst in a sufficient quantity of solution to cover it, and separating after adequate diffusion, as by draining off the excess solution.

Thus a method which involves initially treating the roasted catalyst with an aqueous solution of metal nitrates and heating to 600–700° F. to decompose the nitrates prior to carbonate extraction and water-wash, yields a catalyst containing only about 35–40% of the original sulfur, or effects about a 60–65% reduction. For example, a catalytic material which originally contained 1.35% residual sulfur yielded, on such treatment, a catalyst containing 0.47% sulfur.

When nitric acid is used, either by itself, or in conjunction with nitrates of catalytic metals, in treating a catalyst in accordance with the present invention, the amount should preferably be such as to cause a minimum of dissolution of the metal or metal oxide in the spent catalyst. In other words my invention is not primarily concerned with converting a majority or all of the metal in the spent catalyst to the nitrate form.

The nitric acid and/or solution of heavy metal nitrate used in step 3 above should be employed in volume sufficient to cover the body of catalyst soaking therein. The aqueous nitrate solution used in step 3 is normally saturated with nickel nitrate or with the nitrates of the metals in the catalyst being treated, at the operating temperatures which are normally within the range of from atmospheric to about 150° F. Where a mixed catalyst is being treated the proportions of the nitrates in this solution is preferably substantially the same as that in the catalyst. Where the nitric acid is used with the nitrate solution the amount of $HNO_3$ may vary over the range covering from 0% to about a 100% excess of nitrate calculated on the basis of the metal nitrate present.

*Example 1*

A roasted spent copper-nickel hydrogenation catalyst which contained 1.35% sulfur was treated for two hours with a solution of mixed nitrates containing 50 grams per liter of $Ni(NO_3)_2 \cdot 6H_2O$ and 10 grams per liter of $Cu(NO_3)_2 \cdot 3H_2O$. The catalyst was soaked without agitation in a slight excess of the solution, whereupon the mixture was allowed to drain, and the catalyst was roasted at 700° F. for 12 hours. The roasted catalyst was allowed to cool, then extracted with an excess of a 30% of saturated solution of sodium carbonate by soaking for four hours and draining, and then washed and dried. The residual sulfur was 0.488 per cent. On heating in the presence of hydrogen-containing gas at 350° F. the carbonates were decomposed and reduced to the catalytically active metals.

*Example 2*

Identically the same procedure was followed as in Example 1 except that to the solution of nitrates used for the initial treatment, nitric acid was added in such amount as to give a 125% nitrate content. This was accomplished by adding 70% $HNO_3$ (sp. gr. 1.42) to the nitrates solution in the proportion of 0.15 ml. for each 12 ml. of the nitrates solution.

The residual sulfur was 0.215%.

*Examples 3 to 5*

The procedure of Example 2 was repeated but using increasing amounts of $HNO_3$. The results were as follows:

| Example | Nitrate content | Residual sulfur |
| --- | --- | --- |
|  | Percent | Percent |
| 3 | 150 | 0.183 |
| 4 | 175 | 0.122 |
| 5 | 200 | 0.052 |

Thus it is seen that sulfur removal depends upon the conversion of insoluble sulfur to a soluble form that this conversion is essentially dependent on the concentration of nitric acid in the nitrate solution.

*Example 6*

A roasted alkali carbonate-extracted spent hydrogenation catalyst containing copper and nickel was treated at 70–80° F. for a period of about two hours with a saturated solution of copper and nickel nitrates, in the same relative proportions as in the catalyst, plus excess nitric acid in an amount corresponding to about a 100% excess of nitrate, i. e. in amount sufficient to give a total nitrate content of about 200% calculated with respect to the cupric copper and nickelous nickel. The catalytic material was then heated in air at 700° F. for 12–15 hours. It was then cooled and extracted with a 25% saturated solution of sodium carbonate for about four hours; whereupon it was washed with a continuous stream of fresh water until the wash water was essentially free of sulfur. This reduced the residual sulfur to below 0.1%, namely to approximately 0.05%, which amount is not considered harmful in the hydrogenation catalyst. By this method approximately 96% of the residual sulfur was removed thereby restoring the catalyst activity essentially to its original value.

Less preferably the regeneration may be conducted without the carbonate extraction (step 2 above), between roasting and nitrate treatment, as mentioned above.

A possible modification of the invention involves treatment at an elevated temperature of an unroasted, spent copper and/or nickel catalyst with nitric acid and conversion of the sulfur to a soluble sulfate, followed by roasting as in step 4 above to effect decomposition of the nitrate and removal of all nitrogen oxides combined therein, carbonate extraction to form metallic carbonates and washing until the wash liquid is essentially free of sulfur. Various other modifications of this method may be employed to produce a catalyst which is highly active and essentially free of sulfur.

In the treatment, in accordance with the present invention, of a roasted, spent copper and/or nickel catalyst with a nitrate and/or nitric acid, followed by nitrate decomposition, carbonate extraction, and washing the loss of copper and/or nickel is relatively low. In the case of a catalyst which contained 2.99% of copper originally, the regenerated catalyst contained 2.93% of copper. A catalyst which originally contained 12.4% of nickel showed 11.8% of nickel after regeneration. Such losses are largely mechanical due to rubbing off of the metal from the catalyst in handling and are not attributable to the chemical steps of my invention.

The catalyst regenerated in accordance with the foregoing disclosure is particularly adapted for use in the non-destructive hydrogenation of olefins though my invention is not limited to hydrogenation catalyst of that type but is broadly applicable to any hydrogenation catalyst which has become poisoned or spent by the action of sulfur forming sulfides therein, with or without accompanying deposition of carbonaceous material in the catalyst.

While the treatment of a roasted spent copper and/or nickel catalyst with a solution of corresponding nitrates or with a solution of such nitrates containing excess nitric acid, followed by nitrate-decomposition, carbonate extraction, and washing has been described as the principal embodiment of the present invention, I do not wish to be limited thereto, but only by the language of the appended claims. Likewise the invention is not to be limited to any theory of the mechanisms of the reactions involved but only as set forth in the claims. Thus whereas the invention is described as specifically applied to hydrogenation catalyst, it is applicable to catalysts used in any reaction in which they become poisoned by the action of sulfur encountered either in elemental form or as sulfur compounds. Usually it is applied to catalysts containing heavy metals, either as such or as the oxide, poisoned by sulfur which has reacted with the heavy metal content to form the metal sulfide. Likewise, while it is preferred to use a nitrate of a metal which, or the oxide or which, is catalytic for the conversion reaction in which the poisoning has taken place, and specifically a nitrate of the same metal as that present in the catalyst, I am not necessarily limited thereto but may, though less preferably, use nitrates of other metals such as the nitrates of the alkali metals or alkaline earth metals. Difficulties are frequently encountered using such nitrates for they hydrolyze to a limited extent, thus decreasing the effective acid action, and decompose only at higher temperatures so that the oxidizing action is markedly reduced. Moreover the alkali hydroxides in particular cause the difficulty of fluxing the catalyst carrier. Accordingly it is preferred to use nitrates of the heavy metals since these are readily decomposable upon heating to the corresponding metal oxide and nitrogen oxide.

I claim:

1. A process for the regeneration of sulfur-poisoned solid contact metal and metal oxide hydrogenation catalysts comprising in combination the steps of roasting the catalyst in air at 900° to 1200° F. to remove combustible material, to lower the sulfur content and to form sulfur salts, cooling the catalyst and contacting it with an aqueous solution of an alkali metal carbonate to convert soluble salts of the catalyst metal to insoluble carbonates, washing away the soluble material with water, roasting the catalyst in air at 600° to 700° F. to drive off gases and form oxides, contacting the catalyst with a solution containing at least one metal nitrate the solution having nitrate ions in an amount from 1 to 2 times that amount equivalent stoichiometrically to the positive metal ions therein to convert water insoluble sulfur to a soluble form, roasting the catalyst in air at 600° to 700° F. to drive off gases and form oxides, cooling the catalyst and contacting it with an aqueous solution of an alkali metal carbonate to convert soluble salts of the catalyst metal to insoluble carbonates, washing away the soluble material with water, and drying the catalyst prior to re-use.

2. A process for the regeneration of sulfur-poisoned hydrogenation catalysts selected from the group consisting of manganese, iron, cobalt, nickel and their oxides, comprising in combination the steps of roasting the catalyst in air at 900° to 1200° F. to remove combustible material, to lower the sulfur content and to form sulfur salts, cooling the catalyst and contacting it with an aqueous solution of an alkali metal carbonate to convert soluble salts of the catalyst metal to insoluble carbonates, washing away the soluble material with water, roasting the catalyst in air at 600° to 700° F. to drive off gases and form oxides, contacting the catalyst with a solution containing at least one metal nitrate the solution having nitrate ions in an amount from 1 to 2 times that amount equivalent stoichiometrically to the positive metal ions therein to convert water insoluble sulfur to a soluble form, roasting the catalyst in air at 600° to 700° F. to drive off gases and form oxides, cooling the catalyst and contacting it with an aqueous solution of an alkali metal carbonate to convert soluble salts of the catalyst metal to insoluble carbonates, washing away the soluble material with water, and drying the catalyst prior to re-use.

3. A process of regenerating sulfur-poisoned catalysts which are composed of metals whose carbonates are substantially insoluble, whose nitrates are soluble in water, and whose nitrates will decompose on heating to give oxides of the metal comprising in combination the steps of roasting the catalyst in air at 900° to 1200° F. to remove combustible material, to lower the sulfur content and to form sulfur salts, cooling the catalyst and contacting it with an aqueous solution of an alkali metal carbonate to convert soluble salts of the catalyst metal to insoluble carbonates, washing away the soluble material with water, roasting the catalyst in air at 600° to 700° F. to drive off gases and form oxides, contacting the catalyst with a solution containing at least one metal nitrate the solution having nitrate ions in an amount from 1 to 2 times that amount equivalent stoichiometrically to the positive metal ions therein to convert water insoluble sulfur to a soluble form, roasting the catalyst in air at 600° to 700° F. to drive off gases and form oxides, cooling the catalyst and contacting it with an aqueous solution of an alkali metal carbonate to convert soluble salts of the catalyst metal to insoluble carbonates, washing away the soluble material with water, and heating the catalyst to decompose metal carbonates and to drive off gases whereby the catalyst is regenerated.

4. A process for the regeneration of a sulfur-poisoned solid contact metal hydrogenation catalyst comprising in combination the steps of roasting the catalyst in air at 900° to 1200° F. to remove combustible material, to lower the sulfur content and to form sulfur salts, contacting the catalyst with a solution containing at least one metal nitrate the solution having nitrate ions in an amount from 1 to 2 times that amount equivalent stoichiometrically to the positive metal ions therein to convert water insoluble sulfur to a soluble form, roasting the catalyst in air at 600° to 700° F. to drive off gases and form oxides, cooling the catalyst and contacting it with an aqueous solution of an alkali metal carbonate to convert soluble salts of the catalyst metal to insoluble carbonates, washing away the soluble material with water, heating the catalyst to decompose metal carbonates and to drive off gases, and reducing oxides formed during the process to the metallic state whereby the catalyst is regenerated.

5. A process according to claim 4 in which the catalyst contains metallic copper.

6. A process according to claim 4 in which the catalyst contains metallic nickel.

7. A process of regenerating sulfur-poisoned catalysts which are composed of metals whose carbonates are substantially insoluble, whose nitrates are soluble in water, and whose nitrates will decompose on heating to give oxides of the metal comprising in combination the steps of roasting the catalyst in air at 900° to 1200° F. to remove combustible material, to lower the sulfur content and to form sulfur salts, contacting the catalyst with a solution containing at least one metal nitrate the solution having nitrate ions in an amount from 1 to 2 times that amount equivalent stoichiometrically to the positive metal ions therein to convert water insoluble sulfur to a soluble form, roasting the catalyst in air at 600° to 700° F. to drive off gases and form oxides, cooling the catalyst and contacting it with an aqueous solution of an alkali metal carbonate to convert soluble salts of the catalyst metal to insoluble carbonates, washing away the soluble material with water, and drying the catalyst prior to re-use.

8. A process for the regeneration of sulfur-poisoned solid contact metal and metal oxide hydrogenation catalysts, which comprises contacting the catalyst with a solution containing at least one metal nitrate the solution having nitrate ions in an amount from 1 to 2 times that amount equivalent stoichiometrically to the positive metal ions therein to convert water insoluble sulfur to a soluble form, roasting the catalyst in air at 600° to 700° F. to drive off gases and form oxides, cooling the catalyst and contacting it with an aqueous solution of an alkali metal carbonate to convert soluble salts of the catalyst metal to insoluble carbonates, washing away the soluble material with water, and drying the catalyst prior to re-use.

9. A process for the regeneration of a sulfur-poisoned solid contact metallic hydrogenation catalyst, which comprises cooling the catalyst and contacting it with an aqueous solution of an alkali metal carbonate to convert soluble salts of the catalyst metal to insoluble carbonates, washing away the soluble material with water, roasting the catalyst in air at 600° to 700° F. to drive off gases and form oxides, contacting the catalyst with a solution containing at least one metal nitrate the solution having nitrate ions in an amount from 1 to 2 times that amount equivalent stoichiometrically to the positive metal ions therein to convert water insoluble sulfur to a soluble form, roasting the catalyst in air at 600° to 700° F. to drive off gases and form oxides, cooling the catalyst and contacting it with an aqueous solution of an alkali metal carbonate to convert soluble salts of the catalyst metal to insoluble carbonates, washing away the soluble material with water, and heating the catalyst to decompose metal carbonates and to drive off gases whereby the catalyst is regenerated.

10. A process for the regeneration of a sulfur-poisoned metallic hydrogenation catalyst containing copper which comprises cooling the catalyst and contacting it with an aqueous solution of an alkali metal carbonate to convert soluble salts of the catalyst metal to insoluble carbonates, washing away the soluble material with water, roasting the catalyst in air at 600° to 700° F. to drive off gases and form oxides, contacting the catalyst with a solution containing at least one metal nitrate the solution having nitrate ions in an amount from 1 to 2 times that amount equivalent stoichiometrically to the positive metal ions therein to convert water insoluble sulfur to a soluble form, roasting the catalyst in air at 600° to 700° F. to drive off gases and form oxides, cooling the catalyst and contacting it with an aqueous solution of an alkali metal carbonate to convert soluble salts of the catalyst metal to insoluble carbonates, washing away the soluble material with water, and drying the catalyst prior to re-use.

11. A process for the regeneration of a sulfur-poisoned metallic catalyst containing nickel which comprises cooling the catalyst and contacting it with an aqueous solution of an alkali metal carbonate to convert soluble salts of the catalyst metal to insoluble carbonates, washing away the soluble material with water, roasting the catalyst in air at 600° to 700° F. to drive off gases and form oxides, contacting the catalyst with a solution containing at least one metal nitrate the solution having nitrate ions in an amount from 1 to 2 times that amount equivalent stoichiometrically to the positive metal ions therein to convert water insoluble sulfur to a soluble form, roasting the catalyst in air at 600° to 700° F. to drive off gases and form oxides, cooling the catalyst and contacting it with an aqueous solution of an alkali metal carbonate to convert soluble salts of the catalyst metal to insoluble carbonates, washing away the soluble material with water, and drying the catalyst prior to re-use.

FREDERICK E. FREY.

CERTIFICATE OF CORRECTION.

Patent No. 2,381,659. August 7, 1945.

FREDERICK E. FREY.

It is hereby certified that error appears in the printed specification of the above numbered patent requiring correction as follows: Page 2, first column, line 47, for "course" read --these--; page 3, second column, line 18, for "thep resence" read --the presence--; line 48, after "form" insert --and--; page 4, second column, line 35, claim 2, after "nickel" insert --and copper--; and that the said Letters Patent should be read with this correction therein that the same may conform to the record of the case in the Patent Office.

Signed and sealed this 27th day of November, A. D. 1945.

Leslie Frazer (Seal)                First Assistant Commissioner of Patents.